H. Maycock.
Hay Loader.
No. 44,540.     Patented Oct. 4, 1864.
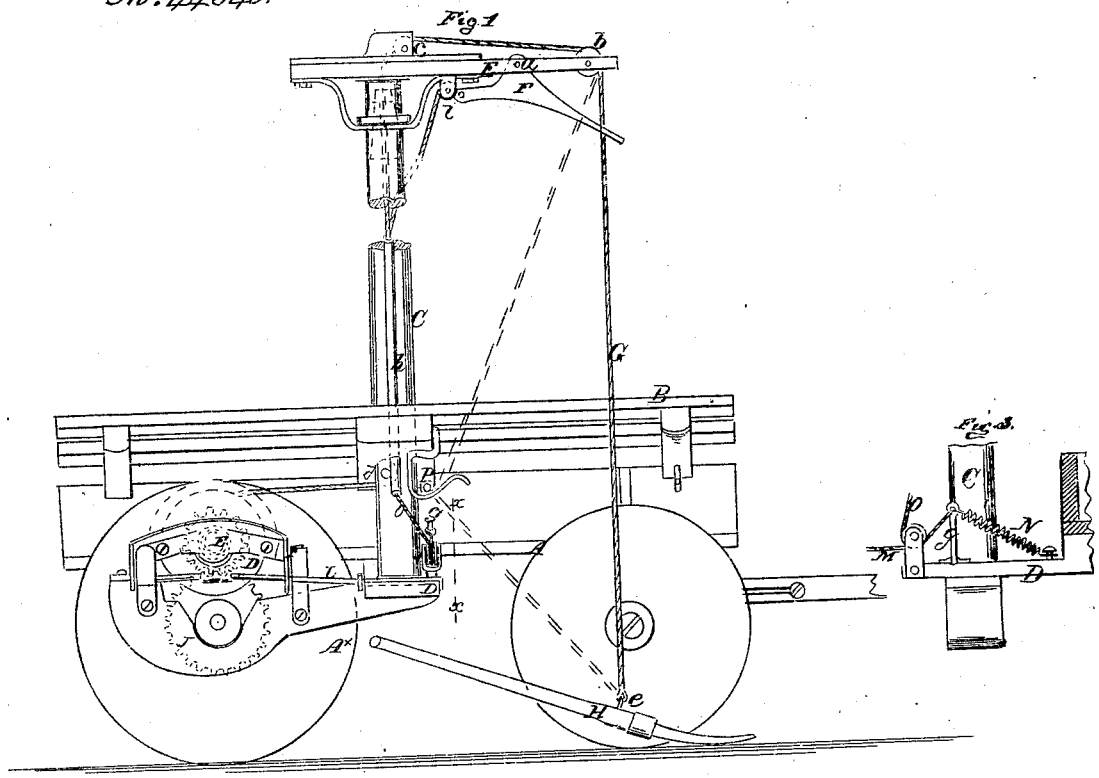
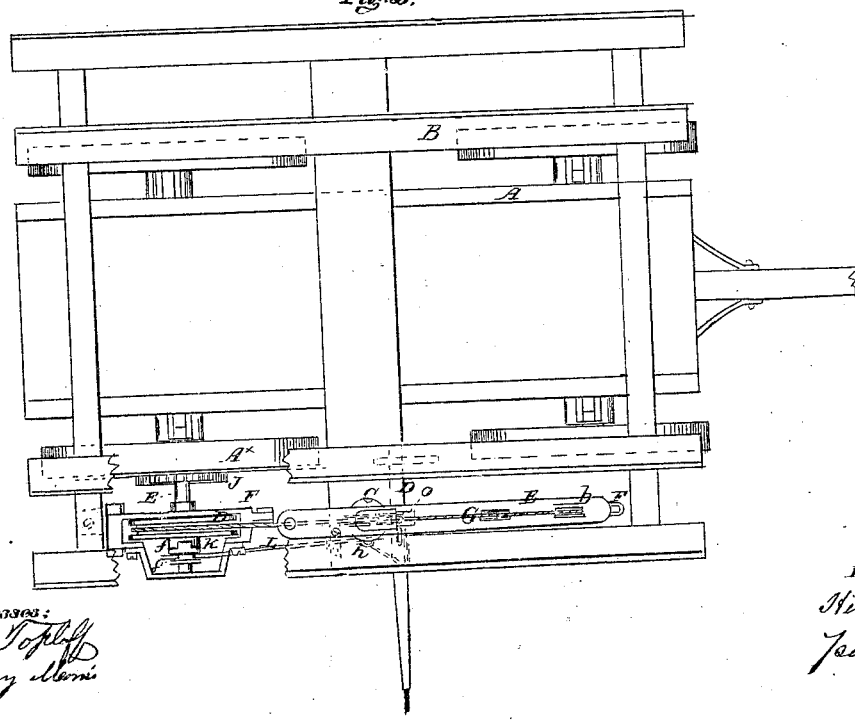

UNITED STATES PATENT OFFICE.

HENRY MAYCOCK, OF VERONA, NEW YORK.

IMPROVEMENT IN MACHINES FOR LOADING HAY.

Specification forming part of Letters Patent No. 44,540, dated October 4, 1864.

*To all whom it may concern:*

Be it known that I, HENRY MAYCOCK, of Verona, in the county of Oneida and State of New York, have invented a new and Improved Hay-Loading Device; and I do hereby declare that the following is a full, clear, and exact description thereof, which will enable others skilled in the art to make and use the same, reference being had to the accompanying drawings, making a part of this specification, in which—

Figure 1 is a side view of my invention; Fig. 2, a plan or top view of the same; Fig. 3, a section of a portion of the same, taken in the line $x\,x$, Fig. 1.

Similar letters of reference indicate like parts.

This invention relates to a new and improved hay-loading attachment to be applied to wagons, and is designed to be operated from one of the wheels of the same, so that hay may be gathered up from windrows and deposited in or on the wagon, as the latter is drawn along, with but one attendant to manipulate the fork and one to adjust the hay on the wagon.

A represents a wagon, which may be constructed in the usual manner and provided with the ordinary framing, B, to support a load of hay of the required capacity.

C represents a standard, which is attached to a bar, D, projecting from the right side of the wagon, and having a horizontal revolving arm, E, on its upper end, the arm being attached to the standard in any proper manner to insure the free turning or rotating movement of the former.

To the under side of the arm E there is attached, by a fulcrum-pin, $a$, a lever, F, through the outer end of which a rope, G, passes, said rope passing over a pulley, $b$, in the outer end of the arm E, and also over a pulley, $c$, on the arm and over the standard C, said rope extending down through the standard and passing out therefrom underneath a pulley, $d$, and to a pulley, D, placed loosely on a shaft, E, the bearings of which are in a frame, F, attached to the right side of the wagon near to and at the outer side of the back wheel, $A^x$, the rope G being attached to the pulley D. The opposite end of the rope is attached to a fork, H, near its tines, as shown at $e$.

On the shaft E there is a toothed wheel, I, which gears into a wheel, J, on the hub of the wheel $A^x$. The shaft E, it will be seen, is always rotated when the wagon is drawn along; but the pulley D, being placed loosely on said shaft, is only rotated when connected with it, and this connection is effected by means of a clutch, K, one part, $f$, of which is attached to the pulley D, and the other part, $f'$, fitted on the shaft E, so that it may slide thereon, but slide so as to turn with it, the usual feather and groove being employed for that purpose. The sliding part $f'$ of the clutch K is connected with a horizontal shaft, L, having an upright arm, $g$, to one end of which a cord or chain, M, is attached. There is also attached to the arm $g$ a spring, N, which has a tendency to keep the part $f'$ of the clutch engaged with the part $f$. The cord or chain M has a cord or chain, O, attached to it, which passes up through a tube, $h$, attached to the standard C, and passes over a pulley, $i$, under the arm E, and is attached to the inner end of the lever F.

The operation is as follows: The operator has hold of the fork H with one hand and with the other grasps the cord or chain M, so as to keep the part $f'$ of the clutch free from the part $f$, to prevent the pulley D from turning. The hay is gathered up by the fork H, and when the latter is loaded the cord or chain M is slackened and the spring N throws the part $f'$ of the clutch in gear with the part $f$, and the pulley D, being thereby connected with the shaft E, is rotated and the fork H elevated, the operator steadying or guiding the fork, the latter swinging around over the wagon, owing to the tendency of the rope G under the pull to swing the arm E around. When the fork arrives over the proper spot the operator pulls the cord or chain M, thereby releasing the pulley D and admitting of the fork H falling, so that its load may be deposited on the wagon, an attendant on the latter guiding the fork to the spot where the load is required to be deposited. The arm E may be turned around either to the front or rear part of the wagon, according to where the load on the fork is to be placed.

In case the attendant or operator on the ground neglects to pull the cord or chain M, in order to release the fork and stop its rising movement, the result is obtained by the fork coming in contact with the outer end of the lever F, which actuates the cord or chain O, and consequently the cord or chain M.

By this machine the hay, when in windrows, may be raked up into cocks by having the rope G passed once or twice around an arm, P, attached to the right side of the wagon, the elevated mechanism not being employed.

I would remark that the gearing and mechanism which elevates the fork may be covered by a cap or hood, and that said mechanism or its frame F may be sustained by any suitable support at the side of the wagon.

Having thus described my invention, I claim as new and desire to secure by Letters Patent—

1. The standard C, with the horizontal or movable turning arm E at its upper end, in combination with the fork H, rope G, and the elevating mechanism composed of the pulley D, arranged with a clutch and gearing with the back wheel, $A^\times$, of the wagon, substantially as and for the purpose herein set forth.

2. The lever F, applied to the arm E and used in connection with the rope G, chains or cords M O, and the fork-elevating mechanism, substantially as and for the purpose specified.

HENRY MAYCOCK.

Witnesses:
GEO. C. CADWELL,
GEORGE BENEDICT.